(12) United States Patent
Jiang

(10) Patent No.: US 11,880,556 B2
(45) Date of Patent: Jan. 23, 2024

(54) IMAGE PROCESSING FOR IMPLEMENTING MULTIPLE GRAPH REPAIRING FUNCTIONS

(71) Applicant: BEIJING BYTEDANCE NETWORK TECHNOLOGY CO., LTD., Beijing (CN)

(72) Inventor: Ruyu Jiang, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 17/888,333

(22) Filed: Aug. 15, 2022

(65) Prior Publication Data
US 2022/0391079 A1 Dec. 8, 2022

Related U.S. Application Data

(63) Continuation of application No. PCT/CN2021/077223, filed on Feb. 22, 2021.

(30) Foreign Application Priority Data

Feb. 24, 2020 (CN) .......................... 202010113048.9

(51) Int. Cl.
G06F 3/04845 (2022.01)
G06F 3/04847 (2022.01)
(Continued)

(52) U.S. Cl.
CPC ...... *G06F 3/04845* (2013.01); *G06F 3/04847* (2013.01); *G06F 3/04886* (2013.01);
(Continued)

(58) Field of Classification Search
None
See application file for complete search history.

(56) References Cited

U.S. PATENT DOCUMENTS

2004/0037460 A1 2/2004 Luo et al.
2010/0166331 A1 7/2010 Chan et al.
(Continued)

FOREIGN PATENT DOCUMENTS

CN 103927719 A 7/2014
CN 106484614 A 3/2017
(Continued)

OTHER PUBLICATIONS

International Patent Application No. PCT/CN2021/077223; Int'l Written Opinion and Search Report, dated Mar. 26, 2021; 7 pages.

*Primary Examiner* — Jeffrey J Chow
(74) *Attorney, Agent, or Firm* — BakerHostetler

(57) ABSTRACT

An image processing component is provided. The apparatus includes: a display control configured to display an image to be edited in a first region of a display region or display a target image obtained from an image to be edited; an automatic image processing control configured to enter an automatic mode in response to a first control instruction; and a manual image processing control configured to enter a manual mode in response to a second control instruction. In the automatic mode and/or manual mode, the electronic device can switch between different graph repairing functions in response to a function switching instruction.

18 Claims, 6 Drawing Sheets

(51) Int. Cl.
*G06F 3/04886* (2022.01)
*G06T 5/00* (2006.01)
(52) U.S. Cl.
CPC .......... *G06T 5/001* (2013.01); *G06T 2200/24* (2013.01); *G06T 2207/20104* (2013.01)

(56) References Cited

U.S. PATENT DOCUMENTS

| | | | |
|---|---|---|---|
| 2011/0013829 A1* | 1/2011 | Kim | G06T 5/20 |
| | | | 382/165 |
| 2013/0188208 A1* | 7/2013 | Yokoyama | G06F 3/1284 |
| | | | 358/1.13 |
| 2016/0266763 A1* | 9/2016 | Gupta | G06F 3/04842 |
| 2017/0069065 A1* | 3/2017 | Lin | G06T 5/00 |
| 2017/0256084 A1* | 9/2017 | Iglehart | G06V 40/16 |
| 2018/0075523 A1* | 3/2018 | Sartori Odizzio | G06Q 30/0643 |
| 2018/0220952 A1* | 8/2018 | Lee | G06T 7/90 |
| 2018/0286097 A1* | 10/2018 | Wang | G06V 40/16 |
| 2020/0388062 A1* | 12/2020 | Kunieda | G06T 11/60 |
| 2021/0065454 A1* | 3/2021 | Goodrich | G06T 7/194 |
| 2021/0065464 A1* | 3/2021 | Goodrich | G06V 40/166 |

FOREIGN PATENT DOCUMENTS

| | | |
|---|---|---|
| CN | 108038836 A | 5/2018 |
| CN | 109190503 A | 1/2019 |
| CN | 110113483 A | 8/2019 |
| CN | 111338545 A | 6/2020 |

* cited by examiner in an automatic mode, switch between graph repairing functions is performed in response to a function switching instruction, in the automatic mode, perform automatic graph repairing processing on the image to be edited or the target image according to a preset automatic graph repairing rule

501 in a manual mode, switching between graph repairing functions is performed in response to a function switching instruction, in the manual mode, a region to be processed is selected from the image to be edited or the target image in response to a first touch control operation, and manual graph repairing processing is performed on the region to be processed according to the preset manual graph repairing rule based on at least a first operation feature of the first touch control operation

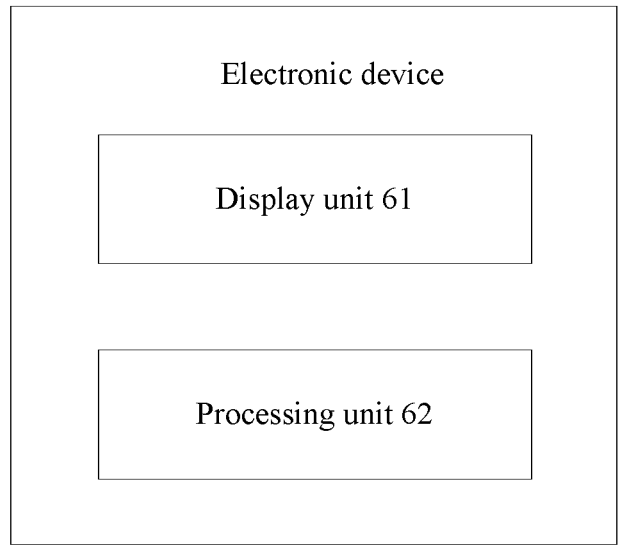

Figure 6

IMAGE PROCESSING FOR IMPLEMENTING MULTIPLE GRAPH REPAIRING FUNCTIONS

CROSS REFERENCE OF RELATED APPLICATION

The present application is a continuation of International Patent Application No. PCT/CN2021/077223, filed on Feb. 22, 2021, which claims the priority to Chinese Patent Application No. 202010113048.9, titled "IMAGE PROCESSING METHOD AND APPARATUS, ELECTRONIC DEVICE AND STORAGE MEDIUM", filed on Feb. 24, 2020, with the State Intellectual Property Office of the PRC, both of which are incorporated herein by reference in their entireties.

FIELD

The present disclosure relates to technical field of images, and in particular to an image processing method, an image processing component, an electronic device and a storage medium.

BACKGROUND

The existing image processing software, such as a graph repairing software, supports automatic graph repairing and manual graph repairing. In order to satisfy the user requirement, multiple graph repairing functions based on effects are developed. For example, the beauty graph repairing includes a skin griding function, a freckle removing and acne removing function a whitening fucniton and so on.

For the existing graph repairing software, switching between the manual mode and the automatic mode can be performed only for a single graph repairing function. For example, if a user select the skin grinding function, switching between the manual mode and the automatic mode can be performed only for the skin grinding function. If the user expects to switch to the freckle removing function in the automatic mode, the user needs to exit from the skin grinding function, select the freckle removing function and select the automatic mode. Apparently, the above operations are complicated, resulting in a bad user experience.

SUMMARY

To solve the above problem, an image processing method, an image processing component, an electronic device and a storage medium are provided according to the present disclosure, so as to switch between graph repairing functions in an automatic mode or a manual mode. In this way, operations are simplified and user experience is improved in a case of satisfying user requirements.

In a first aspect, an image processing component is provided according to embodiments of the present disclosure. The apparatus is applied to an electronic device to realize at least two graph repairing functions. The apparatus includes at least a display control, au automatic image processing control and a manual image processing control. The display control is configured to display an image to be edited in a first region of a display region, or display a target image obtained by processing an image to be edited with the graph repairing function. The automatic image processing control is configured to enter, in response to a first control instruction, an automatic mode in which automatic graph repairing is performed on a preset region of the image to be edited or the target image according to a preset automatic graph repairing rule. The manual image processing control is configured to enter, in response to a second control instruction, a manual mode in which a region to be processed is selected from the image to be edited or the target image based on a first touch control operation, and manual graph repairing is performed on the region to be processed according to a preset manual graph repairing rule based on at least a first operation feature of the first touch control operation. In the automatic mode and/or manual mode, the electronic device is capable of switching between the graph repairing functions in response to a function switching instruction.

According to the technical solution of the present disclosure, the automatic image processing control is provided, and the automatic image processing control can run in an automatic mode in which automatic graph repairing is performed. The manual image processing control is further provided, and the manual image processing control can run in a manual mode in which manual graphic repairing is performed. The automatic image processing control and the manual image processing control do not limit the graph repairing function, that is, supporting switching between the automatic mode and the manual mode for the graph repairing function. In addition, in the automatic mode or the manual mode, switching can be performed between the graph repairing functions in response to the function switching instruction. In the conventional technology, switching can be performed between the manual mode and the automatic mode only in a graph repairing mode. Compared with the solution in the conventional technology, with the technical solution of the present disclosure, operations are simplified and user experience is improved in a case of satisfying user requirements.

In an embodiment, the automatic image processing control is further configured to detect a second touch control operation in the automatic mode, determine an automatic graph repairing intensity feature based on a second operation feature of the second touch control operation, and determine an automatic graph repairing parameter matching with at least the automatic graph repairing intensity feature from preset automatic parameters included in the preset automatic graph repairing rule, to perform automatic graph repairing processing on the preset region.

In the automatic mode, the automatic graph repairing intensity feature can be determined based on the user operation, such as the second operation feature of the second touch control operation, so as to determine the automatic graph repairing parameter, thereby improving control sensation of the user in the automatic mode, and thus being beneficial to satisfy the user requirement and improve the user experience.

In an embodiment, the automatic image processing control is further configured to determine a first target graph repairing function in the automatic mode, and determine an automatic graph repairing parameter matching with the automatic graph repairing intensity feature and the first target graph repairing function from the preset automatic parameters included in the preset automatic graph repairing rule, to perform automatic graph repairing processing on the preset region.

In the automatic mode, the automatic graph repairing intensity feature can be determined based on the user operation, such as the second operation feature of the second touch control operation, and the automatic graph repairing parameter is determined based on the automatic graph repairing intensity feature and the current graph repairing function, such as the first target graph repairing function, thereby improving control sensation of the user in the automatic mode, and thus being beneficial to satisfy the user requirement and improve the user experience. In addition, automatic image processing capability is refined, thereby being beneficial to improve automatic image processing effect and improve the user experience.

In an embodiment, the manual image processing control is further configured to: determine a second target graph repairing function, and determine a manual graph repairing parameter matching with at least the second target graph repairing function from preset manual parameters included in the preset manual graph repairing rule, to perform manual graph repairing processing on the region to be processed selected by the first touch control operation, in the manual mode.

In the manual mode, the manual graph repairing parameter can be determined based on the graph repairing function, such as the second target graph repairing function, and the manual graph repairing processing is performed on the region to be processed selected by the first touch control operation, thereby refining the image processing capability in the manual mode, and thus being beneficial to improve the image processing effect and improve the user experience.

In an embodiment, the automatic image processing control is further configured to: display a graph repairing intensity selection region corresponding to the graph repairing function in a region other than the first region in the display region, and determine au automatic graph repairing intensity feature corresponding to the second operation feature by using the graph repairing intensity selection region. The second touch control operation is applied to the graph repairing intensity selection region.

The graph repairing intensity selection region is used to instruct the user to select the graph repairing intensity. The operation is simple and easy to be understood, thereby expanding the application scenario. For example, a user not proficient in the image processing technology can also perform the above operation, thereby satisfying requirements of different users, and thus improving the user experience.

In an embodiment, a prompt identification representing the automatic graph repairing intensity feature is arranged in the graph repairing intensity selection region. When it is switched from the manual mode to the automatic mode for the graph repairing function or it is switched to the graph repairing function, the prompt identification is located at an initial position in the graph repairing intensity selection region.

In an embodiment, the display control is further configured to display a mode switching button in a region other than the first region in the display region; generate, in response to a second touch control operation applied on the mode switching button, a mode switching instruction, to switch from a current automatic mode to a manual mode or switch from a current manual mode to the automatic mode.

The mode switching button is provided in the display region, thereby being convenient for the user to switch between the automatic mode and the manual mode. In addition, with the mode switching button, mode switching can be performed between different graph repairing functions, and the switching operation is simple, thereby being beneficial to improve the user experience.

In an embodiment, the display control is further configured to display a graph repairing function interface in a region other than the first region in the display region, and display a function button corresponding to the graph repairing function in the graph repairing function interface.

The display control is further configured to generate a function switching instruction in response to a third touch control operation applied on a target function button, and switch between graph repairing functions, to switch to a target graph repairing function selected by the third touch control operation; or switch to a graph repairing function corresponding to the target function button in response to a third touch control operation applied on the target function button.

The function button corresponding to the graph repairing function is displayed on the graph repairing function interface, for example, there is a one-to-one correspondence between the graph repairing functions and the function buttons, and switching can be performed between the graph repairing functions with the displayed function button. The switching operation is simple, thereby being beneficial to improve the user experience.

In an embodiment, the display control is configured to: generate, in the automatic mode or the manual mode, a function switching instruction in response to a third touch control operation applied on a target function button, and switch between the graph repairing functions to switch to a target graph repairing function selected by the third touch control operation; or switch, in the automatic mode or the manual mode, a graph repairing function corresponding to the target function button in response to a third touch control operation applied on a target function button.

In a second aspect, an electronic device is provided according to embodiments of the present disclosure. The electronic device includes: a storage apparatus configured to store an image; and an image processing component connected to the storage apparatus. The image processing component is the image processing component described above.

In a third aspect, an image processing method is provided according to embodiments of the present disclosure. The method can be used to realize at least two graph repairing functions. The method includes: displaying an image to be edited in a first region of a display region of an electronic device, or displaying a target image obtained by processing an image to be edited with the graph repairing function; and switching between the graph repairing functions in response to a function switching instruction in a case that the electronic device is in an automatic mode, where in the automatic mode, the electronic device performs automatic graph repairing processing on a preset region of the image to be edited or the target image according to a preset automatic graph repairing rule; and/or switching between the graph repairing functions in response to a function switching instruction in a case that the electronic device is in a manual mode, where in the manual mode, a region to be processed is selected from the image to be edited or the target image based on a first touch control operation, and manual graph repairing processing is performed on the region to be processed according to a manual graph repairing rule based on at least a first operation feature among the first touch control operation.

In an embodiment, the method further includes: detecting a second touch control operation, determining an automatic graph repairing intensity feature based on a second operation feature of the second touch control operation, and determining an automatic graph repairing parameter matching with at least the automatic graph repairing intensity feature from preset automatic parameters included in the preset automatic graph repairing rule to perform automatic graph repairing processing on the preset region, when the electronic device is in the automatic mode.

In an embodiment, the process of determining an automatic graph repairing parameter matching with at least the automatic graph repairing intensity feature from preset automatic parameters included in the preset automatic graph repairing rule to perform automatic graph repairing processing on the preset region includes: determining a first target graph repairing function, and determining an automatic graph repairing parameter matching with the automatic graph repairing intensity feature and the first target graph repairing function from the preset automatic parameters included in the preset automatic graph repairing rule, to perform automatic graph repairing processing on the preset region.

In an embodiment, the method further includes: determining a second target graph repairing function, determining a manual graph repairing parameter matching with at least the second target graph repairing function from preset manual parameters included in the preset manual graph repairing rule, to perform manual graph repairing processing on the region to be processed selected by the first touch control operation.

In an embodiment, the method further includes: detecting a second touch control operation applied on a graph repairing intensity selection region corresponding to the graph repairing function, and determining an automatic graph repairing intensity feature based on a second operation feature of the second touch control operation. The graph repairing intensity selection region corresponding to the graph repairing function is located in a region other than the first region in the display region.

In an embodiment, a prompt identification representing the automatic graph repairing intensity feature is arranged in the graph repairing intensity selection region. When it is switched from the manual mode to the automatic mode for the graph repairing function or it is switched to the graph repairing function, the prompt identification is located at an initial position in the graph repairing intensity selection region.

In an embodiment, the method further includes: generating a mode switching instruction in response to a second touch control operation applied on a mode switching button, and switching from a current automatic mode to a manual mode or switching from a current manual mode to the automatic mode. The mode switching button is displayed in a region other than the first region in the display region.

In an embodiment, the method further includes: displaying a graph repairing function interface in a region other than the first region in the display region, and displaying a function button corresponding to the graph repairing function in the graph repairing function interface; and generating, in response to a third touch control operation applied on a target function button, a function switching instruction, and switching between the graph repairing functions to switch to a target graph repairing function selected by the third touch control operation; or switching to a graph repairing function corresponding to a target function button in response to a third touch control operation applied on the target function button.

In an embodiment, the method further includes: generating, in the automatic mode or the manual mode, a function switching instruction in response to the third touch control operation applied on the target function button, and switching between the graph repairing functions to switch to the target graph repairing function selected by third touch control operation; or switching, in the automatic mode or the manual mode, to the graph repairing function corresponding to the target function button in response to the third touch control operation applied on the target function button.

In a fourth aspect, an electronic device is provided according to embodiments of the present disclosure. The electronic device can realize at least two graph repairing functions. The electronic device includes a display unit and a processing unit. The display unit is configured to display an image to be edited in a first region of a display region, or display a target image obtained by processing an image to be edited with the graph repairing function. The processing unit is configured to switch between the graph repairing functions in response to a function switching function, when the electronic device is in the automatic mode, where in the automatic mode, the electronic device performs automatic graph repairing processing on a preset region of the image to be edited or the target image according to a preset automatic graph repairing rule; and/or configured to switch between the graph repairing functions in response to the function switching instruction when the electronic device is in the manual mode. In the manual mode, a region to be processed is selected from the image to be edited or the target image based on the first touch control operation, and manual graph repairing processing is performed on the region to be processed according to a preset manual graph repairing rule based on at least a first operation feature of the first touch control operation.

In an embodiment, the processing unit is further configured to: detect a second touch control operation, determine an automatic graph repairing intensity feature based on a second operation feature of the second touch control operation, and determine an automatic graph repairing parameter matching with at least the automatic graph repairing intensity feature from preset automatic parameters included in the preset automatic graph repairing rule, to perform automatic graph repairing processing on the preset region, when the electronic device is in the automatic mode.

In an embodiment, the processing unit is further configured to: determine a first target graph repairing function, and determine an automatic graph repairing parameter matching with the automatic graph repairing intensity feature and the first target graph repairing function from the preset automatic parameters included in the preset automatic graph repairing rule, to perform automatic graph repairing processing on the preset region.

In an embodiment, the processing unit is configured to: determine a second target graph repairing function, and determine a manual graph repairing parameter matching with at least the second target graph repairing function from preset manual parameters included in the preset manual graph repairing rule, to perform manual graph repairing processing on the region to be processed selected by the first touch control operation, when the electronic device is in the manual mode.

In an embodiment, the display unit is configured to display a graph repairing intensity selection region corresponding to the graph repairing function in a region other than the first region in the display region. The processing unit is further configured to detect a second touch control operation applied on the graph repairing intensity selection region corresponding to the graph repairing function, and determine an automatic graph repairing intensity feature based on a second operation feature of the second touch control operation.

In an embodiment, the display unit is further configured to display a mode switching button in a region other than the first region in the display region. The processing unit is further configured to: generate a mode switching instruction in response to a second touch control operation applied on the mode switching button, and switch from a current automatic mode to a manual mode or switch from a current manual mode to the automatic mode.

In an embodiment, the display unit is further configured to display a graph repairing function interface in a region other than the first region in the display region, and display a function button corresponding to the graph repairing function in the graph repairing function interface. The processing unit is further configured to generate a function switching instruction in response to a third touch control operation applied on a target function button, and switch between graph repairing functions, to switch to a target graph repairing function selected by third touch control operation; or switch to a graph repairing function corresponding to the target function button in response to the third touch control operation applied on the target function button.

In an embodiment, the processing unit is further configured to: generate, in the automatic mode or the manual mode, a function switching instruction in response to a third touch control operation applied on a target function button, and switch between graph repairing functions, to switch to a target graph repairing function selected by the third touch control operation; or switch, in the automatic mode or the manual mode, to a graph repairing function corresponding to the target function button in response to a third touch control operation applied on a target function button.

In a fifth aspect, an electronic device is provided according to embodiments of the present disclosure. The electronic device includes: one or more processors; and a memory in communication connection with the one or more processors. One or more applications are stored in the memory. The applications are executed by the one or more processors to perform the method described above.

In a sixth aspect, a computer readable storage medium storing a computer program is provided according to embodiments of the present disclosure. The programs are executed by a processor to perform the method described above.

In a seventh aspect, a computer program product including a computer instruction is provided according to embodiments of the present disclosure. The computer instruction is executed by a processor to perform the method described in the third aspect.

According to the technical solution of the present disclosure, the automatic image processing control is provided, and the automatic image processing control can run in an automatic mode in which automatic graph repairing is performed. The manual image processing control is further provided, and the manual image processing control can run in a manual mode in which manual graphic repairing is performed. The automatic image processing control and the manual image processing control do not limit the graph repairing function, that is, supporting switching between the automatic mode and the manual mode for the graph repairing function. In addition, in the automatic mode or the manual mode, switching can be performed between the graph repairing functions in response to the function switching instruction. In the conventional technology, switching can be performed between the manual mode and the automatic mode only in a graph repairing mode. Compared with the solution in the conventional technology, with the technical solution of the present disclosure, operations are simplified and user experience is improved in a case of satisfying user requirements.

BRIEF DESCRIPTION OF THE DRAWINGS

FIG. 5 is a schematic flowchart of an image processing method according to an embodiment of the present disclosure;

FIG. 6 is a schematic structural diagram of logic units of an electronic device according to an embodiment of the present disclosure.

DETAILED DESCRIPTION

In order to make objects, technical solutions and advantages of the present disclosure to be clearer and easier to be understood, the present disclosure is further described in detail in conjunction with drawings and embodiments hereinafter. It should be understood that the embodiments described herein are only used to explain the present disclosure rather than limit the present disclosure.

Multiple operations performed in a specific order are included in flows described in specification, claims and the above drawings of the present disclosure. It should be understood that the flows may include more or fewer operations, and the operations may be performed in an order or in parallel.

An image processing component is provided according to an embodiment of the present disclosure. The apparatus is applied to an electronic device and can realize at least two graph repairing functions. Solutions of the present disclosure are described in detail hereinafter with reference to FIG. 1 to FIG. 4. The image processing component includes at least a display control, an automatic image processing control and a manual image processing control.

The display control is configured to display an image to be edited in a first region of a display region, or display a target image obtained by processing an image to be edited with the graph repairing function.

The automatic image processing control is configured to enter, in response to a first control instruction, an automatic mode in which automatic graph repairing is performed on a preset region of the image to be edited or the target image according to a preset automatic graph repairing rule.

The manual image processing control is configured to enter, in response to a second control instruction, a manual mode in which a region to be processed is selected from the image to be edited or the target image based on a first touch control operation, and manual graph repairing is performed on the region to be processed according to a preset manual graph repairing rule based on at least a first operation feature of the first touch control operation (such as touch control intensity, or the number of times of clicking in a predetermined time period).

In the automatic mode and/or the manual mode, the electronic device can switch between graph repairing functions at least in response to a function switching instruction. That is, in the automatic mode, switching can be performed between the graph repairing functions; and in the manual mode, switching can also be performed between the graph repairing functions. In the conventional technology, switching can be performed between the manual mode and the automatic mode only in the graph repairing mode. According to the solution of the present disclosure, operations are simplified, and the operations are flexible, thereby improving user experience in a case of satisfying the user requirement.

Figure 1:
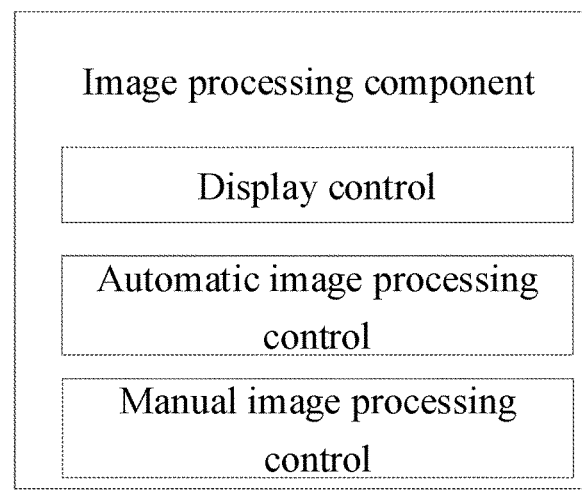
FIG. 1 is a schematic structural diagram of an image processing component according to an embodiment of the present disclosure.
Figure 2:
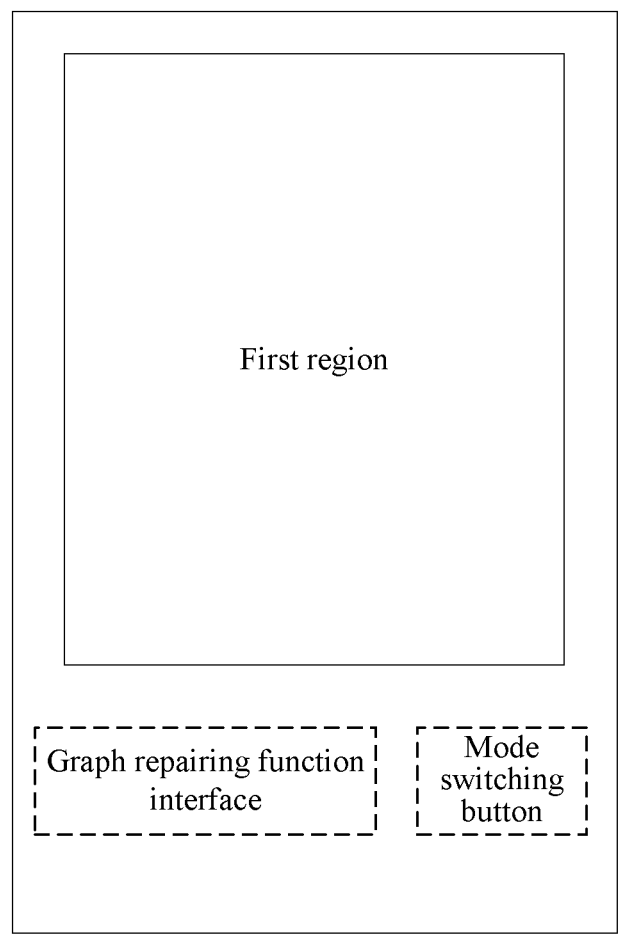
FIG. 2 is a first schematic diagram of an interface of the image processing component according to the embodiment of the present disclosure in an example.
Figure 3:
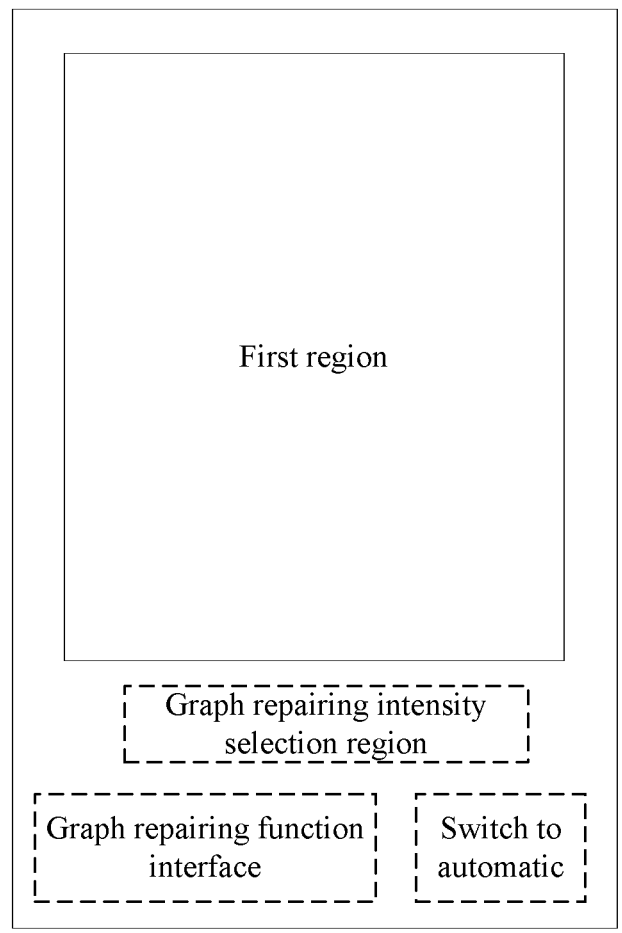
FIG. 3 is a second schematic diagram of the interface of the image processing component according to the embodiment of the present disclosure in an example.
Figure 4:
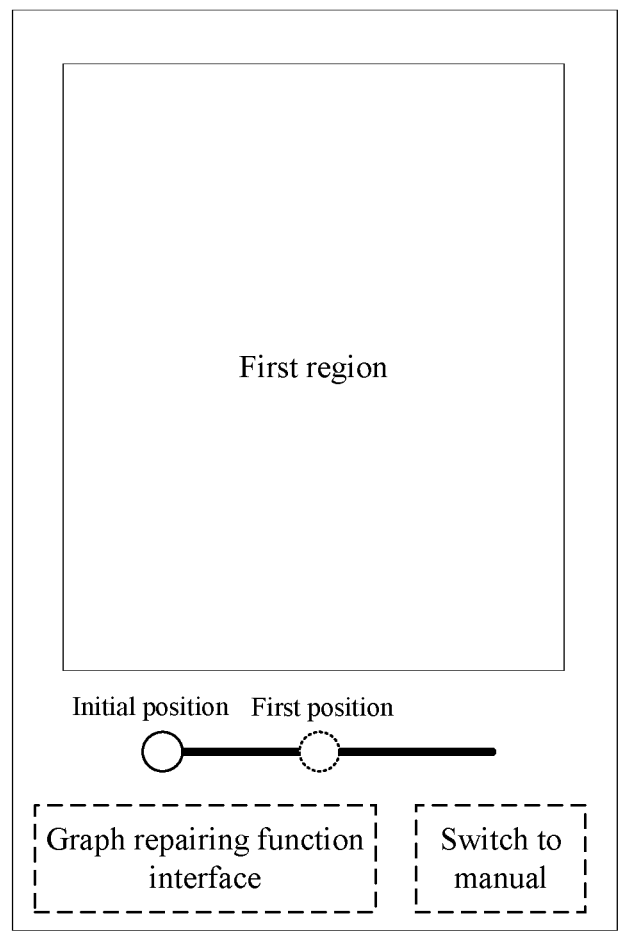
FIG. 4 is a third schematic diagram of the interface of the image processing component according to the embodiment of the present disclosure in an example.

In an example, in order to be convenient for a user to switch between the automatic mode and the manual mode in a graph repairing process, the display control is configured as follows. Specifically, as shown in FIG. 2, the display control is configured to: display a mode switching button in a region other than a first region in the display region; generate a mode switching instruction in response to a second touch control operation (such as clicking operation) applied on a mode switching button, to switch from a current automatic mode to a manual mode, or switch from a current manual mode to an automatic mode. That is, if the electronic device is currently in the automatic mode, a mode switching instruction is generated by clicking the mode switching button to switch to the manual mode. Accordingly, if the electronic device is currently in the manual mode, a mode switching instruction is generated by clicking the mode switching button, to switch to the automatic mode. Switching between the manual mode and the automatic mode can be performed with the mode switching button. In a practical application, as shown in FIG. 3, when the electronic device is in the manual mode, the mode switching button may display prompt information for prompting to enter the automatic mode, such as "switch to automatic" to prompt the user that the mode can be switched. Similarly, as shown in FIG. 4, when the electronic device is in the automatic mode, the mode switching button may display prompt information for prompting to enter the manual mode, such as "switch to manual" to prompt the user that the mode can be switched.

In another example, supported graph repairing functions may be displayed in a graph repairing function interface in order to satisfy the graph repairing requirement of the user. As shown in FIG. 2, the display control is further configured to display a graph repairing function interface in a region other than the first region in the display region, and display a function button corresponding to the graph repairing function in the graph repairing function interface.

The display control is further configured to generate a function switching instruction in response to a third touch control operation (such as clicking operation) applied on a target function button (a function button corresponding to a certain graph repairing function in the graph repairing function interface), and switch between the graph repairing functions to switch to a target graph repairing function selected by the third touch control operation. For example, a first function button corresponding to a first graph repairing function and a second function button corresponding to a second graph repairing function are displayed in the graph repairing function interface, and the electronic device is currently in a first graph repairing function mode. In this case, if the user clicks the second function button corresponding to the second graph repairing function, a function switching instruction is generated to switch a second graph repairing function selected by the clicking operation. Therefore, the switching between functions is performed by the function button arranged in the graph repairing function interface. Alternatively, the display control is configured to switch to a graph repairing function corresponding to a target function button in response to a third touch control operation applied on the target function button. For example, the first function button corresponding to the first graph repairing function and the second function button corresponding to the second graph repairing function are displayed in the graph repairing function interface, and the electronic device is not in any graph repairing function mode presently, for example, the image processing component is just started. In this case, when the second function button corresponding to the second graph repairing function is clicked, it is switched to the second graph repairing function. Graph repairing can be performed on the image to be edited or the target image with the target graph repairing function selected by the third touch control operation, to satisfy different graph repairing function requirements of the user.

In an example, as shown in FIG. 2, a graph repairing function interface containing a function button and a mode switching button are displayed in a region other than the first region in the display interface. The display control is further configured to: generate, in the automatic mode or the manual mode, a function switching instruction in response to a third touch control operation applied on a target function button, and switch between graph repairing functions, to switch to a target graph repairing function selected by the third touch control operation. That is, whether in the automatic mode or in the manual mode, the electronic device can switch between the graph repairing functions.

Alternatively, the display control is further configured to switch, in the automatic mode or the manual mode, to a graph repairing function corresponding to the target function button in response to a third touch control operation applied on the target function button. That is, whether in the automatic mode or in the manual mode, the electronic device can directly switch to the selected graph repairing function from an initial state.

In an actual application, an initial state may be set for the electronic device. For example, the image processing component enters the automatic mode by default once being started. In this case, the user may select a required graph repairing function in the graph repairing function interface in the automatic mode; and the graph repairing function is by default in the automatic mode. A mode may be switched to the manual mode by clicking the mode switching button. Practically, the initial state may be set in other manners, and specific set manners are not limited in the embodiment of the present disclosure.

In an actual application, the number of function buttons in the graph repairing interface, that is, the number of graph repairing functions, may be set according to actual requirements, and is not limited in the embodiments of the present disclosure.

In an embodiment, the automatic image processing control is further configured to: detect a second touch control operation in the automatic mode, determine an automatic graph repairing intensity feature based on a second operation feature of the second touch control operation, and determine an automatic graph repairing parameter matching with at least the automatic graph repairing intensity feature from preset automatic parameters included in the preset automatic graph repairing rule, to perform automatic graph repairing processing on a preset region. That is, even if in the automatic mode, the user can select the automatic graph repairing intensity feature by the touch control operation. In another example, the graph repairing intensity feature is associated with a current graph repairing function. For example, the automatic image processing control is further configured to: determine a first target graph repairing function in the automatic mode, and determine an automatic graph repairing parameter matching with the automatic graph repairing intensity feature and the first target graph repairing function from the preset automatic parameter included in the preset automatic graph repairing rule, to perform automatic graph repairing processing on the preset region. In this case, the automatic graph repairing intensity feature is not only associated with the touch control operation of the user, but also associated with the current graph repairing function, that is, associated with the first target graph repairing function.

A graph repairing intensity selection region may be arranged in order to conveniently select the graph repairing intensity by the user in the automatic mode. As shown in FIG. 3, the automatic image processing control is further configured to display a graph repairing intensity selection region corresponding to the graph repairing function in the region other than the first region in the display region, and determine the automatic graph repairing intensity feature corresponding to the second operation feature (such as moving trajectory) with the graph repairing intensity selection region. The second touch control operation is applied on the graph repairing intensity selection region. That is, the automatic graph repairing intensity feature can be determined based on the operation feature of the touch control operation applied to the graph repairing intensity selection region.

For facilitating image processing and parameter setting, a prompt identification representing an automatic graph repairing intensity feature is arranged in the graph repairing intensity selection region. The graph repairing function switched from the manual mode to the automatic mode, or the prompt identification is located at an initial position in the graph repairing intensity selection region when it is in the graph repairing function mode. That is, the automatic graph repairing intensity feature can be represented by the position of the prompt identification in the graph repairing intensity selection region. For example, as shown in FIG. 4, the graph repairing intensity selection region may be represented by a sliding rod. An initial position is arranged at the leftmost end of the sliding rod. The prompt identification may be controlled to move from the initial position to a first position in response to the touch control operation of the user. In this case, the automatic graph repairing intensity feature can be determined based on a distance between the initial position and the first position.

In another example, the manual image processing control is further configured to determine a second target graph repairing function in the manual mode, and determine a manual graph repairing parameter matching with at least the second target graph repairing function from the preset manual parameters included in the preset manual graph repairing rule, to perform manual graph repairing processing on the region to be processed selected by the first touch control operation. That is, in the manual mode, the manual graph repairing parameter may match with the current graph repairing function. In an actual application, the manual graph repairing parameter may also be related to the operation strength of the touch control operation of the user. Factors related to the manual graph repairing parameter are not limited in the present disclosure.

According to the technical solution of the present disclosure, the automatic image processing control is provided, and the automatic image processing control can run in an automatic mode in which automatic graph repairing is performed. The manual image processing control is further provided, and the manual image processing control can run in a manual mode in which manual graphic repairing is performed. The automatic image processing control and the manual image processing control do not limit the graph repairing function, that is, supporting switching between the automatic mode and the manual mode for the graph repairing function. In addition, in the automatic mode or the manual mode, switching can be performed between the graph repairing functions in response to the function switching instruction. In the conventional technology, switching can be performed between the manual mode and the automatic mode only in a graph repairing mode. Compared with the solution in the conventional technology, with the technical solution of the present disclosure, operations are simplified and user experience is improved in a case of satisfying user requirements.

Embodiments of the present disclosure are further described in detail in conjunction with specific application scenarios hereinafter. It is assumed that the image processing component supports three graph repairing functions: skin grinding function, freckle removing and acne removing function, and whitening function. The actual application may include the following two scenarios.

First Scenario

An image processing component is started to select the skin grinding function, and a graph repairing mode is by default an automatic mode for the skin grinding function. That is, automatic graph repairing is performed for the skin grinding function. In this case, switching between functions is performed by clicking a function button, and graph repairing processing is also performed in the automatic mode for the switched function. For example, the whitening function is clicked, and automatic graph repairing is performed for the whitening function.

Alternatively, a mode switching button is clicked to switch the mode. As shown in FIG. 4, the image processing component switches to a manual mode when the "switch to manual" button is clicked. In this case, manual graph repairing is performed for the skin grinding function. Switching between functions is performed by clicking another function button. Graph repairing processing is performed for the switched function in the manual mode.

Second Scenario

The image processing component is started to enter an automatic mode by default, and a graph repairing function is not determined. In this case, the user clicks the "switch to manual" button shown in FIG. 4, to switch to the manual mode. Then, skin grinding function is selected, that is, manual graph repairing is performed for the skin grinding function. Similar to the first scenario, function switching can be performed by other function button, and mode switching can be performed by clicking the mode switching button.

According to the technical solution of the present disclosure, switching between the automatic mode and the manual mode can be realized for any graph repairing function. In addition, in the automatic mode or the manual mode, switching between different graph repairing functions can be realized, thereby simplifying the user operations and improving the user experience in case of satisfying the user requirements.

An electronic device is further provided according to an embodiment of the present disclosure. The electronic device includes at least: a storage apparatus configured to store an image; and an image processing component connected to the storage apparatus. The image processing component is applied to the electronic device to realize at least two graph repairing functions. The image processing component is the image processing component described above.

An image processing method is further provided according to an embodiment of the present disclosure to realize at least two graph repairing functions. An image to be edited is displayed in a first region of a display region of the electronic device, or a target image obtained by processing an image to be edited with a graph repairing function is displayed. As shown in FIG. 5, the method includes step 501 and/or step 502 as follows.

In step 501, when the electronic device is in an automatic mode, switching between graph repairing functions is performed in response to a function switching instruction. In the automatic mode, the electronic device performs automatic graph repairing processing on the image to be edited or the target image according to a preset automatic graph repairing rule.

In step 502, when the electronic device is in a manual mode, switching between graph repairing functions is performed in response to a function switching instruction. In the manual mode, a region to be processed is selected from the image to be edited or the target image in response to a first touch control operation, and manual graph repairing processing is performed on the region to be processed according to the preset manual graph repairing rule based on at least a first operation feature of the first touch control operation.

That is, in the automatic mode, switching between graph repairing functions can be realized; and in the manual mode, switching between graph repairing functions can also be realized. In the conventional technology, switching between the manual mode and the automatic mode can be realized only in the graph repairing mode. Compared with the solution in the conventional technology, according to the technical solution of the present disclosure, the operations are simplified and flexible, thereby improving user experience in case of satisfying the user requirement.

It should be noted that, in an actual application, an order of performing steps 501 and 502 is not limited, and step 501 and step 502 may exist in parallel. In one scenario, only step 501 is performed; in another scenario, only step 502 is performed; and in still another scenario, both step 501 and step 502 are performed. In an example, step 501 is performed, and then step 502 is performed. That is, function switching is performed in the automatic mode first, and then the mode is switched to the manual mode to perform function switching. Alternatively, step 502 is performed, and then step 501 is performed. That is, function switching is performed in the manual mode, and then the mode is switched to the automatic mode to perform function switching. The order for performing steps is related to an operation habit or a graph repairing habit of the user, and is not limited in the present disclosure.

In an embodiment, the method further includes: detecting a second touch control operation, determining an automatic graph repairing intensity feature based on a second operation feature of the second touch control operation, and determining an automatic graph repairing parameter matching with at least the automatic graph repairing intensity feature from preset automatic parameters included in the preset automatic graph repairing rule to perform automatic graph repairing processing on the preset region, when the electronic device is in the automatic mode.

In an embodiment, the process of the determining an automatic graph repairing parameter matching with at least the automatic graph repairing intensity feature from preset automatic parameters included in the preset automatic graph repairing rule to perform automatic graph repairing processing on the preset region includes: determining a first target graph repairing function, and determining an automatic graph repairing parameter matching with the automatic graph repairing intensity feature and the first target graph repairing function from the preset automatic parameters included in the preset automatic graph repairing rule, to perform automatic graph repairing processing on the preset region.

In an embodiment, the method further includes: determining a second target graph repairing function, determining a manual graph repairing parameter matching with at least the second target graph repairing function from preset manual parameters included in the preset manual graph repairing rule, to perform manual graph repairing processing on the region to be processed selected by the first touch control operation, when the electronic device is in the manual mode.

In an embodiment, the method further includes: detecting a second touch control operation applied on a graph repairing intensity selection region corresponding to the graph repairing function, and determining an automatic graph repairing intensity feature based on a second operation feature of the second touch control operation. The graph repairing intensity selection region corresponding to the graph repairing function is located in a region other than the first region in the display region.

In an embodiment, a prompt identification representing the automatic graph repairing intensity feature is arranged in the graph repairing intensity selection region. When it is switched from the manual mode to the automatic mode for the graph repairing function or the graph repairing function is selected, the prompt identification is located at an initial position in the graph repairing intensity selection region corresponding to the graph repairing function.

In an embodiment, the method further includes: generating a mode switching instruction in response to a second touch control operation applied on a mode switching button, to switch from a current automatic mode to a manual mode, or switch from a current manual mode to the automatic mode. The mode switching button is located in the region other than the first region in the display region.

In an embodiment, a graph repairing function interface is displayed in the region other than the first region in the display region, and a function button corresponding to the graph repairing function is displayed in the graph repairing function interface. The method further includes: generating, in response to a third touch control operation applied on a target function button, a function switching instruction, and switching between the graph repairing functions to switch to a target graph repairing function selected by the third touch control operation; or switching to a graph repairing function corresponding to a target function button in response to a third touch control operation applied on the target function button.

In an embodiment, the method further includes: generating, in the automatic mode or the manual mode, a function switching instruction in response to the third touch control operation applied on the target function button, and switching between the graph repairing functions to switch to the target graph repairing function selected by the third touch control operation; or switching, in the automatic mode or the manual mode, to the graph repairing function corresponding to the target function button in response to the third touch control operation applied on the target function button.

It should be noted that, the method embodiments are described similarly as the image processing component, and can generate the same beneficial effect as the image processing component. For the technical details not disclosed in the method embodiments of the present disclosure, one may refer to description of the embodiments of the image processing component. For conciseness, details are not repeated herein.

A computer program product including computer instructions is further provided according to an embodiment of the present disclosure. The computer instructions are executed by a processor to perform at least one of the methods according to the present disclosure.

An electronic device is further provided according to an embodiment of the present disclosure, to realize at least two graph repairing functions. As shown in FIG. 6, the electronic device includes a display unit 61 and a processing unit 62.

The display unit 61 is configured to display an image to be edited in a first region of a display region, or display a target image obtained by processing an image to be edited with the graph repairing function.

The processing unit 62 is configured to switch, when the electronic device is in the automatic mode, between graph repairing functions in response to a function switching instruction, where in the automatic mode, the electronic device performs automatic graph repairing processing on a preset region of the image to be edited or the target image according to a preset automatic graph repairing rule; and/or switch, when the electronic device is in the manual mode, between graph repairing functions in response to the function switching instruction, where in the manual mode, a region to be processed is selected from the image to be edited or the target image in response to a first touch control operation and manual graph repairing processing is performed on the region to be processed according to the preset manual graph repairing rule based on at least a first operation feature of the first touch control operation.

In an embodiment, the processing unit 62 is further configured to: detect a second touch control operation, determine an automatic graph repairing intensity feature based on a second operation feature of the second touch control operation, and determine an automatic graph repairing parameter matching with at least the automatic graph repairing intensity feature from preset automatic parameters included in the preset automatic graph repairing rule to perform automatic graph repairing processing on the preset region, when the electronic device is in the automatic mode.

In an embodiment, the processing unit 62 is further configured to: determine a first target graph repairing function, and determine an automatic graph repairing parameter matching with the automatic graph repairing intensity feature and the first target graph repairing function from the preset automatic parameters included in the preset automatic graph repairing rule, to perform automatic graph repairing processing on the preset region.

In an embodiment, the processing unit 62 is further configured to: determine a second target graph repairing function, determine a manual graph repairing parameter matching with at least the second target graph repairing function from preset manual parameters included in the preset manual graph repairing rule, to perform manual graph repairing processing on the region to be processed selected by the first touch control operation, when the electronic device is in the manual mode.

In an embodiment, the processing unit 61 is further configured to: display a graph repairing intensity selection region corresponding to the graph repairing function in a region other than the first region in the display region.

The processing unit 62 is further configured to: detect a second touch control operation applied on a graph repairing intensity selection region corresponding to the graph repairing function, and determine an automatic graph repairing intensity feature based on a second operation feature of the second touch control operation.

In an embodiment, the display unit 61 is further configured to display a mode switching button in a region other than the first region in the display region.

The processing unit 62 is further configured to generate a mode switching instruction in response to a second touch control operation applied on the mode switching button, to switch from a current automatic mode to a manual mode or switch from a current manual mode to an automatic mode.

In an embodiment, the display unit 61 is further configured to display a graph repairing function interface in a region other than the first region in the display region, and display a function button corresponding to the graph repairing function in the graph repairing function interface.

The processing unit 62 is further configured to: generate a function switching instruction in response to a third touch control operation applied on the target function button, and switch between graph repairing functions, to switch to a target graph repairing function selected by the third touch control operation; or switch to a graph repairing function corresponding to the target function button in response to a third touch control operation applied on the target function button.

In an embodiment, the processing unit 62 is further configured to: generate, in a the automatic mode or manual mode, a function switching instruction in response to a third touch control operation applied on the target function button, and switch between graph repairing functions to switch to a target graph repairing function selected by the third touch control operation; or switch, in the current automatic mode or manual mode, to a graph repairing function corresponding to the target function button in response to a third touch control operation applied on the target function button.

It should be noted that, the electronic device is described similarly as the method embodiments, and can generate the same beneficial effect as the method embodiments. For the technical details not disclosed in the embodiments of the electronic device in the present disclosure, one may refer to description of the embodiments of the method embodiments. For conciseness, details are not repeated herein.

An electronic device is further provided according to an embodiment of the present disclosure. The electronic device includes: one or more processors; and a memory in communication connection to the one or more processors. One or more applications are stored in the memory, and the applications are executed by the one or more processors to perform the method described above.

Figure 7:
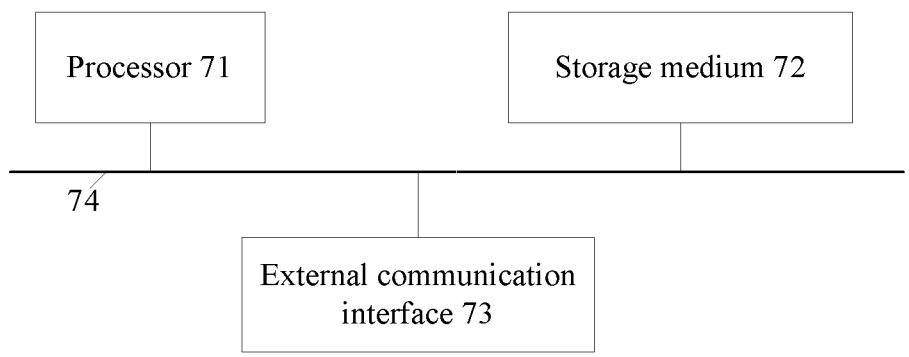
FIG. 7 is a schematic structural diagram of hardware of an electronic device according to an embodiment of the present disclosure.

In an example, the electronic device according to the embodiment of the present disclosure may have a structure shown in FIG. 7. The electronic device includes at least a processor 71, a storage medium 72 and at least one external communication interface 73. The processor 71, the storage medium 72 and the external communication interface 73 are connected to each other via a communication bus 74. The processor 71 may be a microprocessor, a central processing unit, a digital signal processor or an electronic device having a processing function, such as a programmable logic array. The storage medium stores computer executable codes, and the computer executable codes are executed to perform the method according to any of the above embodiments. In an actual application, the display unit 61 and the processing unit 62 may be implemented as the processor 71. Alternatively, the display control, the automatic image processing control and the manual image processing control each may be implemented as the processor 71.

A computer readable storage medium storing computer programs is further provided according to an embodiment of the present disclosure, and the programs are executed by a processor to perform the method described above.

The computer readable storage medium may be any apparatus containing, storing, or transmitting programs for use by an instruction executing system, apparatus or device or use in combination with the instruction executing system, apparatus or device. The computer readable storage medium may include but not limited to: an electric connection portion (electronic apparatus) having one or more wires, a portable computer magnetic disk (a magnetic apparatus), a random access memory (RAM), a read-only memory (ROM), an erasable programmable read only memory (EPROM or a flash memory), an optical fiber, and a portable compact disk read only memory (CD-ROM). In addition, the computer readable storage medium may be papers or other suitable medium on which the programs can be printed. The programs may be obtained by performing optical scanning on the papers or other medium, and then by editing, decoding and other processing manners if necessary, and the programs are then stored in the computer memory.

It should be understood by a person skilled in the art that all or a part of steps in the methods described in the above embodiments may be performed by hardware instructed by a program. The program may be stored in a computer readable storage medium. The program is executed to perform one of steps of the method or combination of steps of the method.

The function apparatuses in the embodiments of the present disclosure may be integrated in one processing module, the function apparatuses may be physically independent from each other, or two or more apparatuses may be integrated in one module. The integrated module may be implemented by hardware or a software function module. If the integrated module is implemented as the software function module and sold or used as an independent product, the integrated module may be stored in a computer readable storage medium. The storage medium may be a read only memory, a magnetic disk or an optical disk.

Only some embodiments of the present disclosure rather than all the embodiments are described above. All other embodiments obtained based on the embodiments of the present disclosure without creative work by those skilled in the art fall within the protection scope of the present disclosure.

The invention claimed is:

1. An image processing component, applied to an electronic device to realize at least two graph repairing functions, the image processing component comprising:
  a display control, configured to display an image to be edited in a first region of a display region or display a target image obtained by processing the image to be edited, the display control further configured to display a mode switching button configured to implement switches between an automatic mode and a manual mode, the display control further configured to display a graph repairing function interface configured to contain a function button and switch between the at least two graph repairing functions, wherein the mode switching button and the graph repairing function interface are displayed on a same page, and wherein the automatic mode or the manual mode entered before switching from one to another graph repairing function is applicable to the switched another graph repairing function among the at least two graph repairing functions;
  an automatic image processing control, configured to enter, in response to a first control instruction generated based on an operation via the mode switching button, the automatic mode in which automatic graph repairing is performed on a preset region of the image to be edited or the target image according to a preset automatic graph repairing rule; and
  a manual image processing control, configured to enter, in response to a second control instruction generated based on another operation via the mode switching button, the manual mode in which a region to be processed is selected from the image to be edited or the target image based on a first touch control operation, and manual graph repairing is performed on the region to be processed according to a preset manual graph repairing rule based on at least a first operation feature of the first touch control operation,
  wherein in the automatic mode and the manual mode, the electronic device is capable of switching between the at least two graph repairing functions in response to a function switching instruction generated based on an operation via the graph repairing function interface.

2. The component according to claim 1,
  wherein the display control is configured to generate, in the automatic mode or the manual mode, a function switching instruction in response to a third touch control operation applied on a target function button, and switch between the at least two graph repairing functions, to switch to a target graph repairing function selected by the third touch control operation; or
  the display control is configured to switch, in the automatic mode or the manual mode, to a graph repairing function corresponding to a target function button in response to a third touch control operation applied on the target function button.

3. An image processing method, the method being capable of realizing at least two graph repairing functions, and the method comprising:
  displaying an image to be edited in a first region of a display region or displaying a target image obtained by processing the image to be edited;
  displaying a mode switching button configured to implement switches between an automatic mode and a manual mode;
  displaying a graph repairing function interface configured to contain a function button, wherein the mode switching button and the graph repairing function interface are displayed on a same page;
  switching between the automatic mode and the manual mode in response to receiving operations via the mode switching button, wherein in the automatic mode, automatic graph repairing processing is performed on a preset region of the image to be edited or the target image according to a preset automatic graph repairing rule, and wherein in the manual mode, a region to be processed is selected from the image to be edited or the target image based on a first touch control operation, and manual graph repairing processing is performed on the region to be processed according to a manual graph repairing rule based on at least a first operation feature of the first touch control operation; and
  switching, in the automatic mode and the manual mode, between the at least two graph repairing functions in response to a function switching instruction generated based on an operation via the graph repairing function interface, wherein the automatic mode or the manual mode entered before switching from one to another graph repairing function is applicable to the switched another graph repairing function among the at least two graph repairing functions.

4. The method according to claim 3, further comprising:
detecting a second touch control operation, determining an automatic graph repairing intensity feature based on a second operation feature of the second touch control operation, and determining an automatic graph repairing parameter matching with at least the automatic graph repairing intensity feature from preset automatic parameters comprised in the preset automatic graph repairing rule to perform automatic graph repairing processing on the preset region, in the automatic mode.

5. The method according to claim 4, wherein the determining an automatic graph repairing parameter matching with at least the automatic graph repairing intensity feature from preset automatic parameters comprised in the preset automatic graph repairing rule to perform automatic graph repairing processing on the preset region comprises:
determining a first target graph repairing function, and determining an automatic graph repairing parameter matching with the automatic graph repairing intensity feature and the first target graph repairing function from the preset automatic parameters comprised in the preset automatic graph repairing rule, to perform automatic graph repairing processing on the preset region.

6. The method according to claim 3, further comprising:
determining a second target graph repairing function, determining a manual graph repairing parameter matching with at least the second target graph repairing function from preset manual parameters comprised in the preset manual graph repairing rule, to perform manual graph repairing processing on the region to be processed selected by the first touch control operation, in the manual mode.

7. The method according to claim 3, further comprising:
generating, in response to a third touch control operation applied on a target function button, a function switching instruction, and switching between the graph repairing functions to switch to a target graph repairing function selected by the third touch control operation; or
switching to a graph repairing function corresponding to a target function button in response to a third touch control operation applied on the target function button.

8. The method according to claim 7, further comprising:
generating, in the automatic mode or the manual mode, a function switching instruction in response to the third touch control operation applied on the target function button, and switching between the graph repairing functions to switch to the target graph repairing function selected by third touch control operation; or
switching, in the automatic mode or the manual mode, to the graph repairing function corresponding to the target function button in response to the third touch control operation applied on the target function button.

9. An electronic device, comprising:
at least one processor; and
at least one memory communicatively coupled to the at least one processor and storing instructions that upon execution by the at least one processor cause the device to perform operations comprising:
displaying an image to be edited in a first region of a display region;
displaying a mode switching button configured to implement switches between an automatic mode and a manual mode;
displaying a graph repairing function interface configured to contain a function button, wherein the mode switching button and the graph repairing function interface are displayed on a same page;
switching between the automatic mode and the manual mode in response to receiving operations via the mode switching button, wherein in the automatic mode, automatic graph repairing processing is performed on a preset region of the image to be edited or the target image according to a preset automatic graph repairing rule, and wherein in the manual mode, a region to be processed is selected from the image to be edited or the target image based on a first touch control operation, and manual graph repairing processing is performed on the region to be processed according to a manual graph repairing rule based on at least a first operation feature of the first touch control operation; and
switching, in the automatic mode and the manual mode, between the at least two graph repairing functions in response to a function switching instruction generated based on an operation via the graph repairing function interface, wherein the automatic mode or the manual mode entered before switching from one to another graph repairing function is applicable to the switched another graph repairing function among the at least two graph repairing functions.

10. A computer readable non-transitory storage medium storing computer programs, wherein the programs that upon execution on a computing device cause the computing device at least to:
display an image to be edited in a first region of a display region of an electronic device or displaying a target image obtained by processing the image to be edited;
display a mode switching button configured to implement switches between an automatic mode and a manual mode;
display a graph repairing function interface configured to contain a function button, wherein the mode switching button and the graph repairing function interface are displayed on a same page;
switch between the automatic mode and the manual mode in response to receiving operations via the mode switching button, wherein in the automatic mode, the electronic device performs automatic graph repairing processing on a preset region of the image to be edited or the target image according to a preset automatic graph repairing rule, and wherein in the manual mode, a region to be processed is selected from the image to be edited or the target image based on a first touch control operation, and manual graph repairing processing is performed on the region to be processed according to a manual graph repairing rule based on at least a first operation feature of the first touch control operation; and
switch, in the automatic mode and the manual mode, between the at least two graph repairing functions in response to a function switching instruction generated based on an operation via the graph repairing function interface, wherein the automatic mode or the manual mode entered before switching from one to another graph repairing function is applicable to the switched another graph repairing function among the at least two graph repairing functions.

11. The device of claim 9, the at least one memory further storing instructions that upon execution by the at least one processor cause the device to:

detect a second touch control operation, determining an automatic graph repairing intensity feature based on a second operation feature of the second touch control operation, and determining an automatic graph repairing parameter matching with at least the automatic graph repairing intensity feature from preset automatic parameters comprised in the preset automatic graph repairing rule to perform automatic graph repairing processing on the preset region, in the automatic mode.

12. The device of claim 11, the at least one memory further storing instructions that upon execution by the at least one processor cause the device to:

determine a first target graph repairing function, and determining an automatic graph repairing parameter matching with the automatic graph repairing intensity feature and the first target graph repairing function from the preset automatic parameters comprised in the preset automatic graph repairing rule, to perform automatic graph repairing processing on the preset region.

13. The device of claim 9, the at least one memory further storing instructions that upon execution by the at least one processor cause the device to:

determine a second target graph repairing function, determining a manual graph repairing parameter matching with at least the second target graph repairing function from preset manual parameters comprised in the preset manual graph repairing rule, to perform manual graph repairing processing on the region to be processed selected by the first touch control operation, in the manual mode.

14. The device of claim 9, the at least one memory further storing instructions that upon execution by the at least one processor cause the device to:

generate, in response to a third touch control operation applied on a target function button, a function switching instruction, and switching between the graph repairing functions to switch to a target graph repairing function selected by the third touch control operation; or switching to a graph repairing function corresponding to a target function button in response to a third touch control operation applied on the target function button.

15. The device of claim 14, the at least one memory further storing instructions that upon execution by the at least one processor cause the device to:

generate, in the automatic mode or the manual mode, a function switching instruction in response to the third touch control operation applied on the target function button, and switching between the graph repairing functions to switch to the target graph repairing function selected by third touch control operation; or switch, in the automatic mode or the manual mode, to the graph repairing function corresponding to the target function button in response to the third touch control operation applied on the target function button.

16. The method according to claim 3, further comprising:

determining a second target graph repairing function, determining a manual graph repairing parameter matching with at least the second target graph repairing function from preset manual parameters comprised in the preset manual graph repairing rule, to perform manual graph repairing processing on the region to be processed selected by the first touch control operation, when the electronic device is in the manual mode.

17. The method according to claim 4, further comprising:

determining a second target graph repairing function, determining a manual graph repairing parameter matching with at least the second target graph repairing function from preset manual parameters comprised in the preset manual graph repairing rule, to perform manual graph repairing processing on the region to be processed selected by the first touch control operation, when the electronic device is in the manual mode.

18. The method according to claim 5, further comprising:

determining a second target graph repairing function, determining a manual graph repairing parameter matching with at least the second target graph repairing function from preset manual parameters comprised in the preset manual graph repairing rule, to perform manual graph repairing processing on the region to be processed selected by the first touch control operation, when the electronic device is in the manual mode.

\* \* \* \* \*